Patented Sept. 14, 1943

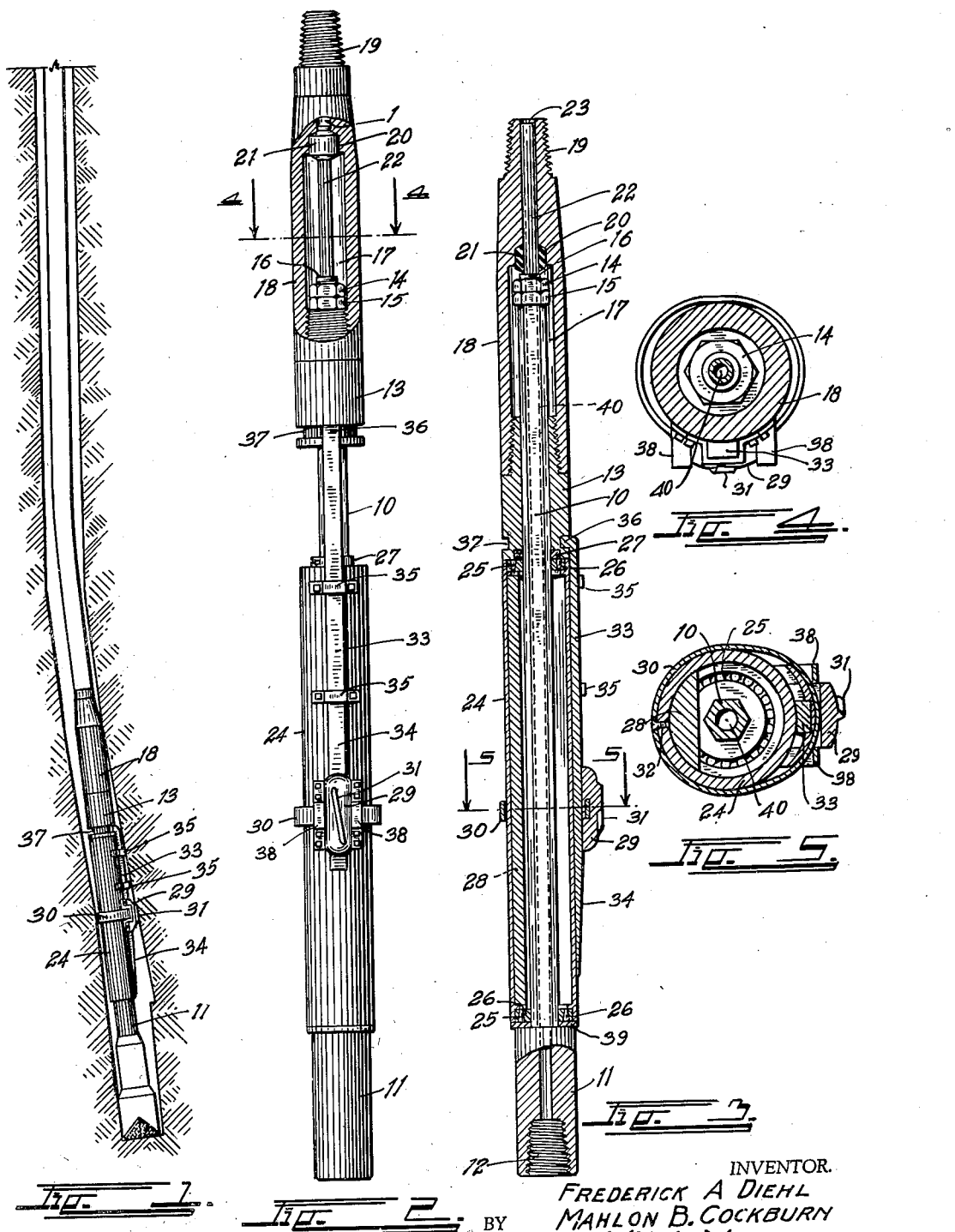

2,329,597

UNITED STATES PATENT OFFICE 2,329,597

DIRECTIONAL DRILLING SUB FOR OIL WELLS

Frederick A. Diehl and Mahlon B. Cockburn, Lusk, Wyo.

Application March 10, 1942, Serial No. 434,155

3 Claims. (Cl. 255—1.6)

This invention relates to a directional drill guiding device for oil wells and has for its principal object the provision of a simple and highly efficient device which can be placed in the tool string either to automatically maintain the hole vertical or to deflect the course of the hole in any desired direction.

Another object of the invention is to provide a tool of this character which will not require orientation at the surface so that it will not be necessary to mark or maintain the tool stem in any desired relation during its insertion in the well, yet which will accurately position itself in the proper direction upon reaching the bottom.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a vertical section through a typical drill hole illustrating the invention in use therein;

Fig. 2 is an enlarged side view of the improved drilling sub in the open or contracted position;

Fig. 3 is a longitudinal section therethrough in the closed or expanded position; and Figs. 4 and 5 are cross sectional views, taken on the lines 4—4, and 5—5, Fig. 3, respectively.

The improved drill guiding device employs a hexagonal stem member 10, having an axial passage 40. The lower extremity of the stem member terminates in a pin socket block 11 in which a standard threaded bit socket 12 is formed. The upper extremity of the stem slides through an axially-positioned, hexagonal passage in a driving member 13 and terminates in a nut chamber 17 formed in a cap member 18. An upper lock nut 14 and a lower lock nut 15 are threaded on a nipple 16 formed on the upper extremity of the stem 10 and clamped against a shoulder formed thereon. The bottom of the nut chamber 17 is closed by a threaded upper extremity on the driving member 13. The top of the cap member 18 terminates in a standard, threaded taper pin 19 by means of which the entire device is attached to the tool string.

A gasket cavity 20 is formed in the top of the nut chamber 17 to receive a sealing gasket 21 which projects downwardly into the nut chamber 17. A sealing tube 22 is threaded into the upper extremity of the stem 10 then extends upwardly through the gasket 21 into slidable engagement with a mud passage 23 in the cap member 18. The lower face of the gasket 21 is preferably convex and the upper face of the stem 10 is preferably concave so that the two, when forced together, will form a perfect sealing seat.

A freely rotatable barrel 24 surrounds the stem 10 intermediate the socket block 11 and the driving member 13. The barrel is journalled on annular, anti-friction bearings 25 surrounding the peripheries of bearing discs 26. The bearing discs are fitted over the stem 10 at each extremity of the barrel 24 and are held in longitudinal position thereon by means of a suitable set collar 27. One side of the barrel carries a counterweight 28, which may be formed by pouring lead or other heavy molten material therein. Therefore, if the stem 10 is inclined in any direction, the barrel will automatically rotate to allow the counter-weight 28 to come to rest on the lower side thereof.

The barrel carries an expanding dog 29 which is held in place on one side of the barrel by means of a spring steel hoop 30. The hoop passes through a receiving opening in the dog 29 and is secured to the barrel at any desired position by means of a suitable attachment screw 32. The hoop is normally oval in cross section, as shown in Fig. 3, so that its inherent elasticity will constantly tend to urge the dog 29 toward the barrel.

The dog is urged away from the barrel when desired by means of an elongated wedge member 33 which slides into a vertical receiving groove in the inner surface of the dog and which is provided with an inclined wedge surface 34. The wedge member is slidably secured to the side of the barrel by means of offset straps 35 which allow vertical movement of the wedge member but prevent circumferential movement thereof on the barrel. The wedge member extends upwardly above the barrel terminating in a hooked flange 36 which engages in an annular groove 37 in the bearing member 13. Suitable guide members 38 guide the vertical movements of the dog 29 and prevent sideward movements thereof. The dog 29 carries an inclined, elongated tooth or fang 31.

If the device is intended to maintain a drill hole in a vertical position or deflect it to a vertical position, the dog 29 is placed on the barrel diametrically opposite the center of gravity of the counter-weight 28. The improved directional drilling tool is threaded into the tool stem, by means of its pin 19; the drilling bit is threaded into the pin socket block 11; and the device is lowered into the well. Should the well incline from the vertical, the weight 28 will swing to the lower side positioning the dog 29 at the high side thereof, as shown in Fig. 1.

When the bit bottoms in the well, the cap member 18 and the driving member 13 will continue downward along the hexagonal stem. This causes the wedge member 33 to be forced downwardly behind the dog 29 to wedge the latter outwardly and upwardly against the wall on the high side of the well hole. When the limit of movement has been reached, the gasket 21 is pressed against the upper extremity of the stem 10 to seal the mud passage and rotation of the bit will commence. The barrel 24 will remain stationary, however, with its dog pressing against the high side of the hole thus reacting against the barrel to force the bit toward the low side thereof so as to gradually bring the hole to vertical alignment.

Should the improved tool be required to deflect a hole from the vertical, the position of the dog 29 is changed on the barrel to a predetermined relation with the counter-weight 28. For instance, it may be placed on the counter-weight side of the barrel so that the dog will force itself against the low side of the hole so as to force the drill bit to deflect in an arc toward the side opposite the counter-weight. A deflection may be obtained in any other direction by proper positioning of the dog.

It will be noted that the flow of mud is not interfered with since there is a clear passage through the mud passage 23, through the sealing tube 22 and the hollow core passage 40 to the bit. Sealing plates 39 are positioned above and below the bearings 25 to protect them from mud and sand.

There is a tendency for the barrel to rotate in the same direction that the stem 10 rotates due to bearing friction, etc. This tendency may be offset by placing the tooth 31 on an angle, as illustrated, so that when contacting the wall of the drill hole the tooth will tend to rotate the barrel in a direction opposite to its natural rotating tendency so as to counteract the latter.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A directional bit guiding device for oil well drilling comprising: a stem for conveying rotative effort to a drilling bit; a freely rotatable barrel on said stem; a counterweight at one side of said barrel for maintaining the other side thereof upward when said stem is inclined from the vertical; means on the lower end of said stem for attaching a drilling bit; a cap member on the upper end of said stem free to move vertically thereon for a restricted distance; a wall engaging member on said barrel; and a wedge member extending downwardly from said cap member between said wall engaging member and said barrel to force the latter outwardly as the former moves downwardly on said stem.

2. A directional bit guiding device for oil well drilling comprising: a stem for conveying rotative effort to a drilling bit; a freely rotatable barrel on said stem; a counterweight at one side of said barrel for maintaining the other side thereof upward when said stem is inclined from the vertical; means on the lower end of said stem for attaching a drilling bit; a cap member on the upper end of said stem free to move vertically thereof for a restricted distance; a wall engaging member on said barrel; a wedge member extending downwardly from said cap member between said wall engaging member and said barrel to force the latter outwardly as the former moves downwardly on said stem; means for allowing said cap and stem to rotate independently of said wedge member; and means for preventing relative rotation between said wall engaging member and said barrel.

3. A directional bit guiding device for oil well drilling comprising: a stem for conveying rotative effort to a drilling bit; a freely rotatable barrel on said stem; a counterweight at one side of said barrel for maintaining the other side thereof upward when said stem is inclined from the vertical; means on the lower end of said stem for attaching a drilling bit; a cap member on the upper end of said stem free to move vertically thereon for a restricted distance; a wall engaging member on said barrel; a wedge; means for forcing said wedge between said wall engaging member and said barrel in consequence of downward movement of said cap member on said barrel; means for preventing relative axial movement between said barrel and said stem; and means for preventing relative rotative movement between said cap member and said stem.

FREDERICK A. DIEHL.
MAHLON B. COCKBURN.